(12) United States Patent
Joshi (10) Patent No.: US 9,313,270 B2
(45) Date of Patent: Apr. 12, 2016

(54) ADAPTIVE ASYNCHRONOUS DATA REPLICATION IN A DATA STORAGE SYSTEM

(71) Applicant: DataDirect Networks, Inc., Chatsworth, CA (US)

(72) Inventor: Rajkumar Joshi, Simi Valley, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 120 days.

(21) Appl. No.: 14/446,161

(22) Filed: Jul. 29, 2014

(65) Prior Publication Data
US 2016/0036909 A1   Feb. 4, 2016

(51) Int. Cl.
| G06F 11/00 | (2006.01) |
| H04L 29/08 | (2006.01) |
| G06F 11/14 | (2006.01) |
| G06F 3/06 | (2006.01) |
| G06F 17/30 | (2006.01) |

(52) U.S. Cl.
CPC ............ *H04L 67/1095* (2013.01); *G06F 3/065* (2013.01); *G06F 11/1458* (2013.01); *G06F 17/30575* (2013.01); *H04L 67/1097* (2013.01); *Y10S 707/99953* (2013.01)

(58) Field of Classification Search
None
See application file for complete search history.

(56) References Cited

U.S. PATENT DOCUMENTS

| 5,742,792 | A | * | 4/1998 | Yanai | .................... | G06F 3/0601 |
| | | | | | | 71/1 |
| 6,157,991 | A | * | 12/2000 | Arnon | .................. | G06F 11/2064 |
| | | | | | | 711/161 |
| 7,292,969 | B1 | * | 11/2007 | Aharoni | .............. | G06F 11/3419 |
| | | | | | | 703/21 |
| 8,301,593 | B2 | * | 10/2012 | Hoffmann | ........... | G06F 11/2094 |
| | | | | | | 707/615 |
| 8,341,115 | B1 | * | 12/2012 | Natanzon | ............ | G06F 11/1471 |
| | | | | | | 707/613 |
| 8,707,003 | B1 | * | 4/2014 | Mishra | ................... | G06F 3/0611 |
| | | | | | | 711/112 |
| 9,229,829 | B2 | * | 1/2016 | Beeston | .............. | G06F 11/2097 |
| 2004/0260970 | A1 | * | 12/2004 | Beardsley | ........... | G06F 11/2066 |
| | | | | | | 714/6.12 |
| 2007/0130432 | A1 | * | 6/2007 | Aigo | .................... | G06F 11/2074 |
| | | | | | | 711/162 |
| 2008/0109621 | A1 | * | 5/2008 | Burr | ..................... | G06F 11/2069 |
| | | | | | | 711/162 |

\* cited by examiner

*Primary Examiner* — Gabriel Chu
(74) *Attorney, Agent, or Firm* — SoCal IP Law Group LLP; Mark A. Goldstein (57) ABSTRACT

Systems and methods for adaptive asynchronous data replication in a data storage system are described herein. The data storage system includes a plurality of zones each having a plurality of storage nodes, each having a plurality of storage devices. The system provides for replication according to policies associated with data items such that data items are stored among a plurality of zones. The data items are stored as one or more objects and may be replicated asynchronously or synchronously. The system adapts the synchronicity of the replication based on a combination of criteria including a put performance threshold, a backlog threshold, latency and the current synchronicity status. By automatically adjusting the replication synchronicity, the system and methods achieve improved performance while maintaining data resiliency.

20 Claims, 5 Drawing Sheets

ADAPTIVE ASYNCHRONOUS DATA REPLICATION IN A DATA STORAGE SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to data stored in a data storage system and a method for storing data in a data storage system that allows adaption between synchronous and asynchronous replication.

2. Description of the Related Art

A file system is used to store and organize computer data stored as electronic files. File systems allow files to be found, read, deleted, and otherwise accessed. File systems store files on one or more storage devices. File systems store files on storage media such as hard disk drives, magnetic tape and solid-state storage devices.

Various applications may store large numbers of documents, images, audio, videos and other data as objects using a distributed data storage system in which data is replicated and stored in multiple locations for resiliency.

DETAILED DESCRIPTION

The systems and methods described herein provide for adaptive resilient storage in which data replication is switched between synchronous and asynchronous modes to balance between the competing performance requirements of system storage throughput and data storage resiliency.

Environment

Figure 1:
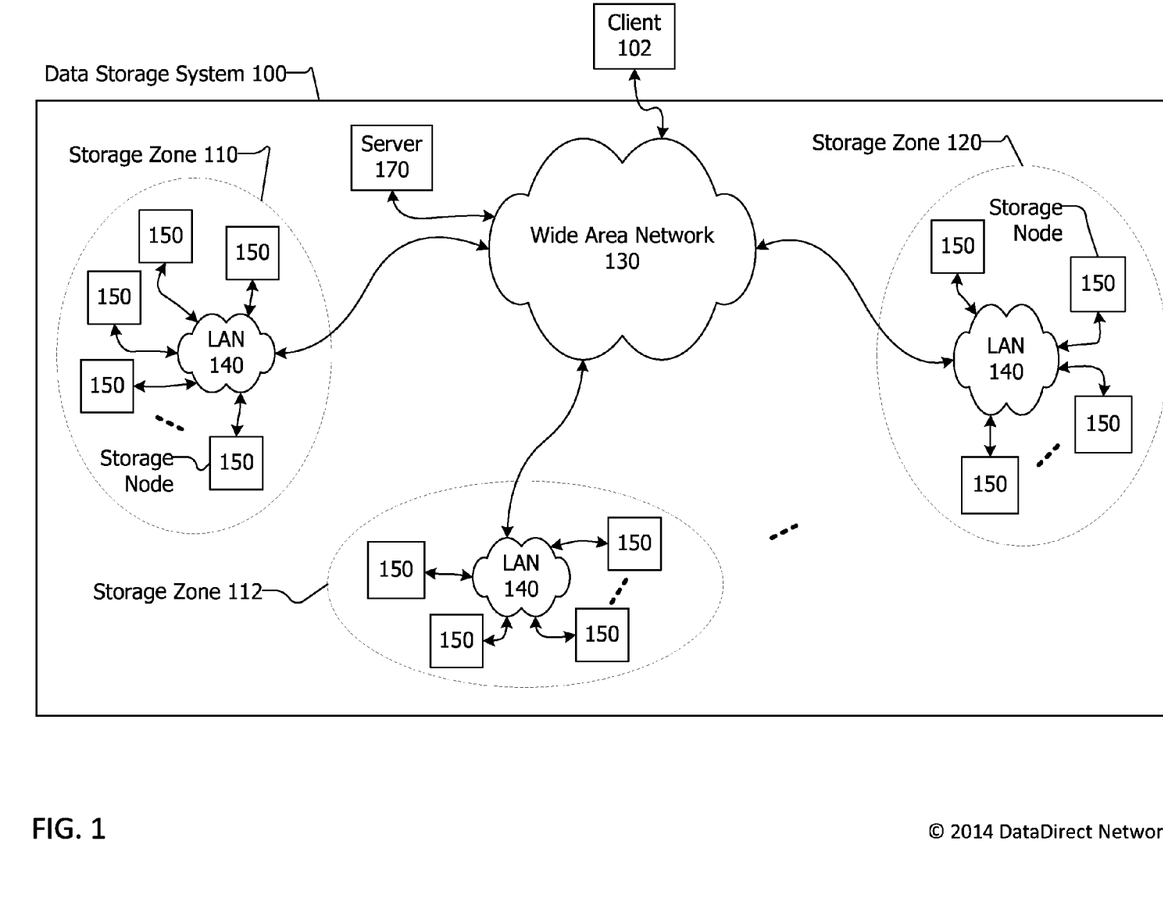
FIG. 1 is a block diagram of a data storage system.

FIG. 1 is a block diagram of a data storage system 100. The data storage system 100 includes at least two storage zones. The data storage system 100 typically includes multiple storage zones that are independent of one another. The storage zones may be autonomous. The storage zones may be in a peer-to-peer configuration. The storage zones may be geographically dispersed. In the example shown, the data storage system 100 includes three storage zones, first storage zone 110, second storage zone 112 and third storage zone 120. In other configurations, more than three storage zones are included in the data storage system. The storage zones may replicate data included in other storage zones. The data storage system 100 may be a distributed replicated data storage system.

The storage zones 110, 112 and 120 may be separated geographically, may be in separate states, may be in separate countries, may be in separate cities, may be in the same location, may be in separate racks, may be in separate buildings on a shared site, may be on separate floors of the same building, and arranged in other configurations. The storage zones 110, 112 and 120 communicate with each other and share objects over wide area network 130. The wide area network 130 may be or include the Internet. The wide area network 130 may be wired, wireless, or a combination of these. The wide area network 130 may be public or private, may be a segregated network, and may be a combination of these. The wide area network 130 includes networking devices such as routers, hubs, switches and the like.

The data storage system 100 may include a server 170 coupled with wide area network 130. The server 170 may augment or enhance the capabilities and functionality of the data storage system by promulgating policies, receiving and distributing search requests, compiling and/or reporting search results, and tuning and maintaining the storage system. The server 170 may include and maintain an object database on a local storage device included in or coupled with the server 170. The object database may be indexed according to the object identifier or OIDs of the objects stored in the data storage system. In various embodiments, the object database may only store a small amount of information for each object or a larger amount of information. Pertinent to this patent is that the object database store policy information for objects. In one embodiment, the object database is an SQLITE® database. In other embodiments, the object database may be a MONGODB®, Voldemort, or other key-value store. The objects and the object database may be referenced by object identifiers or OIDs like those shown and described below regarding FIG. 3.

The term data as used herein includes a bit, byte, word, block, stripe or other unit of information. In one embodiment, data is stored within and by the distributed replicated data storage system as objects. A data item may be store as one object or multiple objects. That is, an object may be a data item or a portion of a data item. As used herein, the term data item is inclusive of entire computer readable files or portions of a computer readable file. The computer readable file may include or represent text, numbers, data, images, photographs, graphics, audio, video, raw data, scientific data, computer programs, computer source code, computer object code, executable computer code, and/or a combination of these and similar information.

Many data intensive applications store a large quantity of data, these applications include scientific applications, newspaper and magazine websites (for example, nytimes.com), scientific lab data capturing and analysis programs, video and film creation software, and consumer web based applications such as social networking websites (for example, FACEBOOK®), photo sharing websites (for example, FLIKR), geo-location based and other information services such as NOW from Google Inc. and SIRI® from Apple Inc., video sharing websites (for example, YOUTUBE®) and music distribution websites (for example, ITUNES®).

Figure 2:
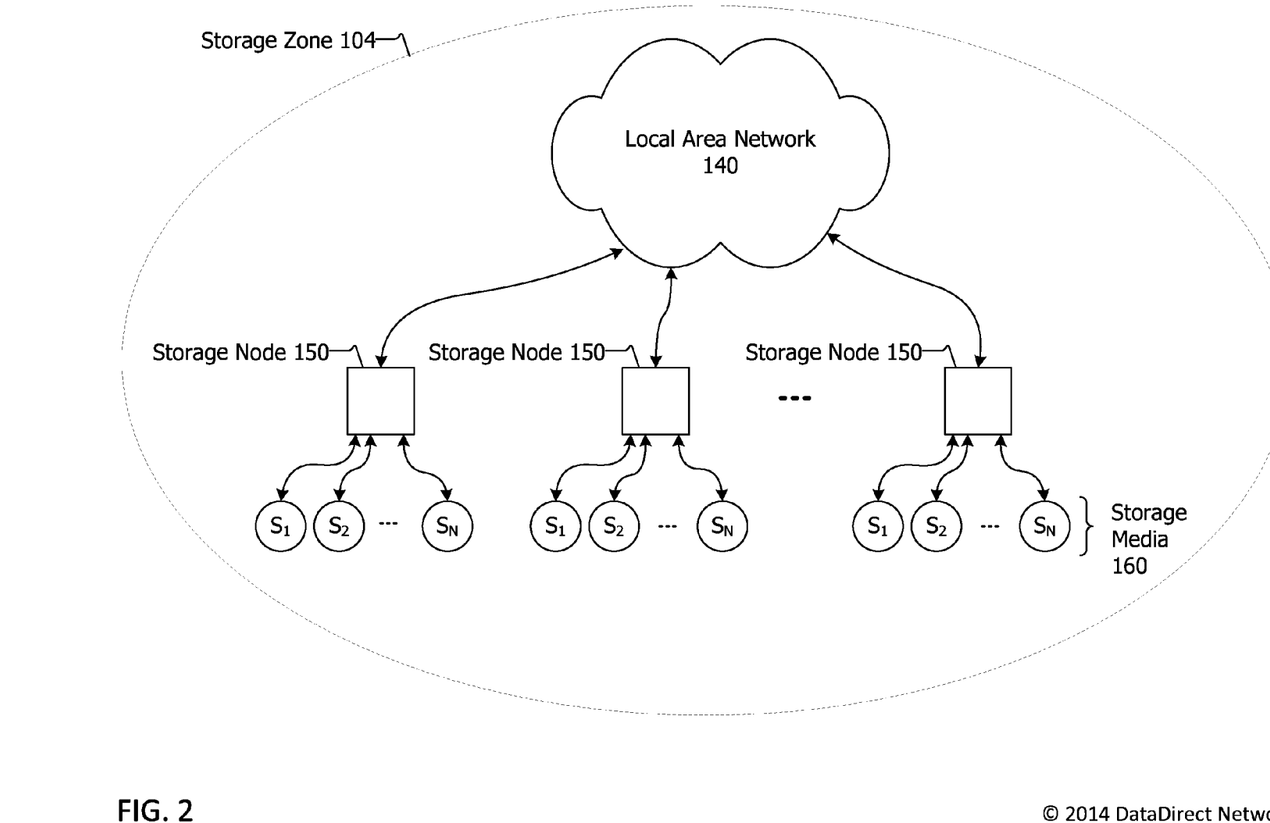
FIG. 2 is a block diagram of a storage zone included in a data storage system.

FIG. 2 is a block diagram of a storage zone 104 included in a data storage system. The storage zones 110 and 120 shown in FIG. 1 are examples of storage zone 104. The storage nodes 150 within a storage zone 104 may be connected via a local area network 140 by wire lines, optical fiber cables, wireless communication connections, and others, and may be a combination of these. The local area network 140 may include one or more networking devices such as routers, hubs, switches and the like.

The storage zones 110, 112, 120 and 104 may include a computing device and/or a controller on which software may execute. The computing device and/or controller may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the computing device and/or controller may include various specialized units, circuits, software and interfaces for providing the functionality and features described herein. The processes, functionality and features described herein may be embodied in whole or in part in software which operates on a controller and/or one or more computing devices in a storage zone, and may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed such that some actions are performed by a controller or computing device, and others by other controllers or computing devices within a storage zone.

A computing device as used herein refers to any device with a processor, memory and a storage device that may execute instructions such as software including, but not limited to, server computers, personal computers, portable computers, laptop computers, smart phones and tablet computers. Server 170 is, depending on the implementation, a specialized or general purpose computing device. The computing devices may run an operating system, including, for example, versions of the Linux, Unix, MICROSOFT® Windows, Solaris, Symbian, Android, Chrome, and APPLE® Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND® network, Fibre Channel, and others. A computing device with a network interface is considered network capable.

Referring again to FIG. 2, the storage zone 104 includes a plurality of storage nodes 150 which include a plurality of storage media 160. Each of the storage nodes 150 may include one or more server computers. Each of the storage nodes 150 may be an independent network attached storage (NAS) device or system. The terms "storage media" and "storage device" are used herein to refer nonvolatile media and storage devices. Nonvolatile media and storage devices are media and devices that allow for retrieval of stored information after being powered down and then powered up. That is, nonvolatile media and storage devices do not lose stored information when powered down but maintain stored information when powered down. Storage media and devices refer to any configuration of hard disk drives (HDDs), solid-states drives (SSDs), silicon storage devices, magnetic tape, optical discs, nonvolatile RAM, carbon nanotube memory, ReRam memristors, and other similar nonvolatile storage media and devices. Storage devices and media include magnetic media and devices such as hard disks, hard disk drives, tape and tape players, flash memory and flash memory devices; silicon-based media; nonvolatile RAM including memristors, resistive random-access memory (ReRam), and nano-RAM (carbon nanotubes) and other kinds of NV-RAM; and optical disks and drives such as DVD, CD, and BLU-RAY® discs and players. Storage devices and storage media allow for reading data from and/or writing data to the storage device/storage medium. Hard disk drives, solid-states drives and/or other storage media 160 may also be arranged in the storage nodes 150 according to any of a variety of techniques.

The storage media included in a storage node may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 1, 2 3 and 4 terabytes. Example hard disk drive specifications include Serial Attached Small Computer System Interface (SAS), Serial Advanced Technology Attachment (SATA), and others. An example storage node may include 16 three terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, silicon storage devices, magnetic tape devices, other storage media, or a combination of these. In some embodiments, the physical size of the media in a storage node may differ, and/or the hard disk drive or other storage specification of the media in a storage node may not be uniform among all of the storage devices in a storage node 150.

The storage media 160 in a storage node 150 may be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In one embodiment, a controller for a node or a designated node, which may be called a primary node, may handle coordination and management of the storage zone. The coordination and management handled by the controller or primary node includes the distribution and promulgation of storage and replication policies. The controller or primary node may implement the adaptive replication processes described herein. The controller or primary node may communicate with a server, such as server 170, and maintain and provide local system health information to the requesting server.

In another embodiment, multiple storage nodes 150 are included in a single cabinet or rack such that a storage zone may be included in a single cabinet. When in a single cabinet or rack, storage nodes and/or constituent storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage zone may include a communications interface that allows for connection to other storage zones, a computing device and/or to a network. The rack, shelf or cabinet containing a storage node 150 may include a communications interface that allows for connection to other storage nodes, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing a storage zone may include a network interface chip, chipset, card or device that allows for communication over a wired and/or wireless network, including Ethernet. The backplane or controller in a rack or cabinet containing one or more storage nodes 150 may include a network interface chip, chipset, card or device that allows for communication over a wired and/or wireless network, including Ethernet. In various embodiments, the storage zone, the storage node, the controller and/or the backplane may provide for and support 1, 2, 4, 8, 12, 16, 32, 48, 64, etc. network connections and may have an equal number of network interfaces to achieve this.

The techniques discussed herein are described with regard to storage media and storage devices including, but not limited to, hard disk drives, magnetic tape, optical discs, and solid-state drives. The techniques may be implemented with other readable and writable optical, magnetic and silicon-based storage media as well as other storage media and devices described herein.

In the data storage system 100, files and other data are stored as objects among multiple storage media 160 in a storage node 150. Files and other data are partitioned into smaller portions referred to as objects. The objects are stored among multiple storage nodes 150 in a storage zone. In one embodiment, each object includes a storage policy identifier and a data portion. The object including its constituent data portion may be stored among storage nodes and storage zones according to the storage policy specified by the storage policy identifier included in the object. Various policies may be maintained and distributed or known to the nodes in all zones in the distributed data storage system. The policies may be stored on and distributed from a client 102 to the data storage system 100 and to all zones in the data storage system and to all nodes in the data storage system. The policies may be stored on and distributed from a server 170 to the data storage system 100 and to all zones in the data storage system and to all nodes in the data storage system. The policies may be stored on and distributed from a primary node or controller in each storage zone in the data storage system.

As used herein, policies specify replication and placement for the object among the storage nodes and storage zones of the data storage system. In other versions of the system, the policies may specify additional features and components. The replication and placement policy defines the replication and placement of data objects in the data storage system. Example replication and placement policies include, full distribution, single copy, single copy to a specific zone, copy to all zones except a specified zone, copy to half of the zones, copy to zones in certain geographic area, copy to all zones except for zones in certain geographic areas, and others. A character (e.g., A, B, C, etc.) or number (0, 1, 2, etc.) or combination of one or more characters and numbers (A1, AAA, A2, BC3, etc.) or other scheme may be associated with and used to identify each of the replication and placement policies. The policy may be stored as a byte or word, where a byte is 8 bits and where a word may be 16, 24, 32, 48, 64, 128, or other number of bits. The policy is included as a policy identifier in an object identifier shown in FIG. 3 as policy identifier 308 in object identifier 300.

Referring again to FIG. 1, the client 102 of the storage system 100 may be a computing device such as, for example, a personal computer, tablet, mobile phone, workstation or server, and may be group of computers or computing nodes arranges as a super computer. The wide area network 130 may connect geographically separated storage zones. Each of the storage zones includes a local area network 140.

The data storage systems described herein may provide for one or multiple kinds of storage replication and data resiliency. The data storage systems described herein may operate as a fully replicated distributed data storage system in which all data is replicated among all storage zones such that all copies of stored data are available from and accessible from all storage zones. This is referred to herein as a fully replicated storage system.

Another configuration of a data storage system provides for partial replication such that data may be replicated in one or more storage zones in addition to an initial storage zone to provide a limited amount of redundancy such that access to data is possible when a zone goes down or is impaired or unreachable, without the need for full replication. The partial replication configuration does not require that each zone have a full copy of all data objects.

Replication may be performed synchronously, that is, completed before the write operation is acknowledged; asynchronously, that is, the replicas may be written before, after or during the write of the first copy; or a combination of each. This configuration provides for a resilient storage system. Synchronous replication provides for a high level of data resiliency while asynchronous replication provides for resiliency at a lower level. As described herein, to achieve improved performance in a resilient data storage system, the methods described herein provide an adaptive replication process that switches between synchronous and asynchronous replication to achieve better system performance, namely reduced latency and increased resiliency and policy adherence. The quality of asynchronous and synchronous storage is referred to herein as the synchronicity of the system. The system adapts the synchronicity of the system to provide improved performance.

To facilitate the management and replication of objects in the data storage system, an object database on the server 170 may store information about each object. The object database may be indexed according to the object identifier or OIDs of the objects. The object database may be an SQLITE® database. In other embodiments the database may be a MONGODB®, Voldemort, or other key-value store.

Figure 3:
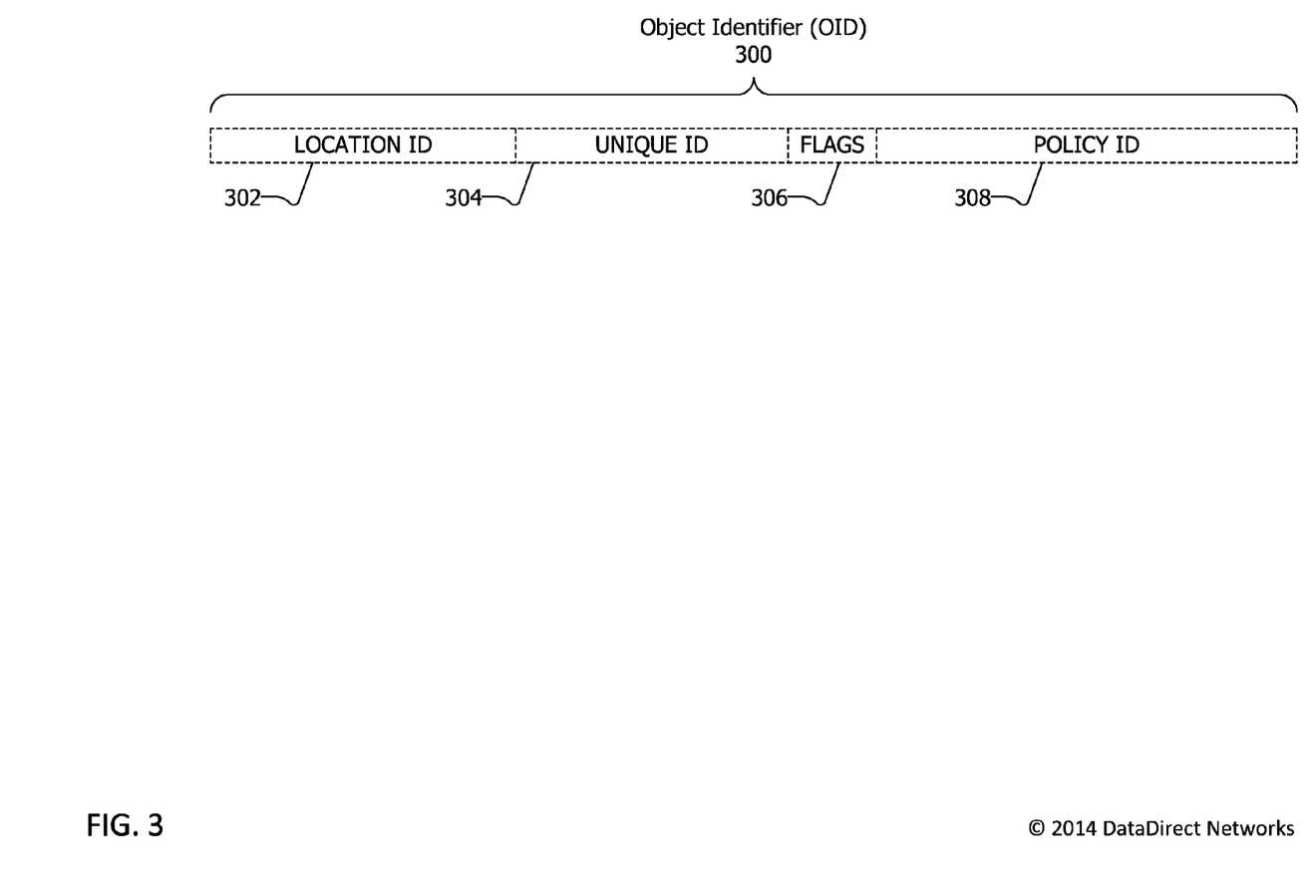
FIG. 3 is a block diagram of an object identifier (OID) for objects stored and managed by the data storage system.

The objects and the object database may be referenced by object identifier or OIDs like those shown and described regarding FIG. 3. Referring now to FIG. 3, a block diagram of an object identifier 300 used in the data storage system is shown. According to the data storage system described herein, an object identifier 300 includes four components and may include three or more components. The object identifier 300 includes a location identifier 302, a unique identifier 304, flags 306 and a policy identifier 308. The object identifier 300 may optionally include flags 306 and other fields. The location identifier 302 specifies a device, address, storage node or nodes where an object resides. The specific format of the location identifier may be system dependent.

In one version of the system, the location identifier 302 is 30 bits, but may be other sizes in other implementations, such as, for example, 24 bits, 32 bits, 48 bits, 64 bits, 128 bits, 256 bits, 512 bits, etc. In one version of the system, the location identifier 302 includes both a group identifier ("group ID") and an index. The group ID may represent a collection of objects stored under the same policy, and having the same searchable metadata fields; the group ID of the object becomes a reference for the embedded database of the object group. The group ID may be used to map the object to a particular storage node or storage device, such as a hard disk drive. The mapping may be stored in a mapping table maintained by the object storage system. The mapping information is distributed and is hierarchical. More specifically, the system stores a portion of mapping information in memory, and the storage nodes hold a portion of the mapping information in their memory. Master copies of the mapping information are kept on disk or other nonvolatile storage medium on the storage nodes. The master copies of the mapping information are dynamically updated to be consistent with any changes made while the system is active. The index may be the specific location of the object within the group. The index may refer to a specific location on disk or other storage device.

The unique identifier 304 is a unique number or alphanumeric sequence that is used to identify the object in the storage system. The unique identifier 304 may be randomly generated, may be the result of a hash function of the object itself (that is, the data or data portion), may be the result of a hash function on the metadata of the object, or may be created using another technique. In one embodiment, the unique identifier is assigned by the controller in such a manner that the storage device is used efficiently. The unique identifier 304 may be stored as 24 bits, 32 bits, 64 bits, 128 bits, 256 bits, 512 bits, 1 kilobyte, etc.

The object identifier 300 may optionally include flags 306. Flags 306 may be used to distinguish between different object types by providing additional characteristics or features of the object. The flags may be used by the data storage system to evaluate whether to retrieve or delete objects. In one embodiment, the flags associated with the object indicate if the object is to be preserved for specific periods of time, or to authenticate the client to ensure that there is sufficient permission to access the object. In one version of the system, the flags 306 portion of the OID 300 is 8 bits, but may be other sizes in other implementations, such as, for example, 16 bits, 32 bits, 48 bits, 64 bits, 128 bits, 256 bits, 512 bits, etc.

The policy identifier 308 is described above.

The total size of the object identifier may be, for example, 128 bits, 256 bits, 512 bits, 1 kilobyte, 4 kilobytes, etc. In one embodiment, the total size of the object identifier includes the sum of the sizes of the location identifier, unique identifier, flags, policy identifier, and version identifier. In other embodiments, the object identifier includes additional data that is used to obfuscate the true contents of the object identifier. In other embodiments, other kinds and formats of OIDs may be used.

In some embodiments, when the data objects are large, the data object may be partitioned into sub-objects. The flags 308 may be useful in the handling of large data objects and their constituent sub-objects. Similarly, the group ID may be included as part of the location ID 304, and may be used in mapping and reassembling the constituent parts of large data objects.

Processes

Figure 4:
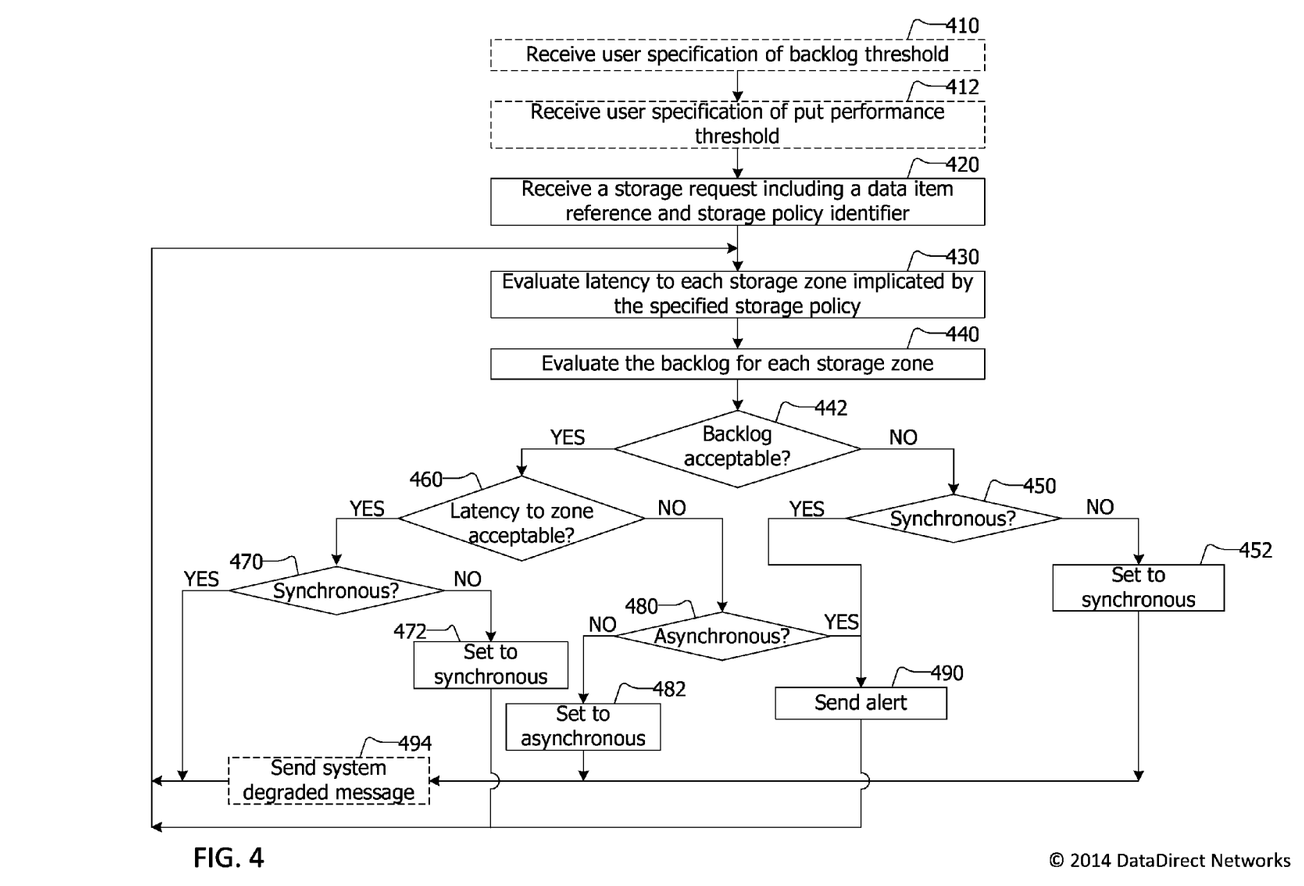
FIG. 4 is a flow chart of the actions taken to store or put data in a data storage system according to an adaptive replication process.

Referring now to FIG. 4, a flow chart of the actions taken to store or put data in a data storage system according to an adaptive replication process is shown. In one version of the system, the system receives user specification of a backlog threshold and a put performance threshold, as shown in blocks 410 and 412. The dashed lines for blocks 410 and 412 signify that these steps are optional. In other versions of the system, the backlog threshold and the put performance threshold may be system defined, system defaults or may be system learned. The backlog threshold may be a certain number of data items (for example, a number of files, or a number of objects), a size of pending data to be stored (in megabytes or gigabytes, for example), or a combination thereof. The put performance may be a preferred maximum communication latency between nodes and/or zones. The put performance may be a time measurement such as less than 30 milliseconds, less than or equal to 50 milliseconds, less than or equal to 100 milliseconds, less than 200 milliseconds, less than 500 milliseconds, etc.

The system learned backlog threshold may be computed based on historical backlog information about the backlog to a zone (or node). The system learned backlog threshold may be computed by applying one or more of or a combination of two or more of exponential smoothing, a taper function, statistical analysis or other functions or analyses to the historical backlog information where the historical backlog information is the backlog for the zone (or node) obtained at multiple points in time over a particular time period, such every N minutes, hours, days or weeks, where N is a whole number or portion thereof. In another implementation, the system learned backlog threshold may be computed by the system taking the average backlog to a zone (or node) over a certain period time such as hours, days or weeks and adding a buffer or weighting of a system preferred percentage or amount to it. That is, the average backlog is an historical backlog for a certain time period. For example, the system learned backlog threshold may be computed as 150% or 200% of the average number of objects pending or 150% or 200% of the average amount of data pending in megabytes or gigabytes, or the average number of objects plus 1000 or plus 5000. These numbers and methods of calculation are only provided as examples; other numbers and methods of calculation may be used.

Similarly, the system learned put performance threshold may be computed based on historical latency information about the latency to a zone (or node). The system learned put performance threshold may be computed by applying one or more of or a combination of two or more of exponential smoothing, a taper function, statistical analysis or other functions or analyses to the historical latency information where the historical latency information is the latency for the zone (or node) obtained at multiple points in time over a particular time period, such every N minutes, hours, days or weeks, where N is a whole number or portion thereof. In another implementation, the system learned put performance threshold may be computed by the system taking the average latency to a zone (or node) over a certain period time such as hours, days or weeks and adding a buffer or weighting of a system preferred percentage or amount to it. That is, the average latency is an historical latency for a certain time period. In another implementation, the system learned put performance threshold may be computed as 150% or 200% of the average latency, or the average latency plus 100 milliseconds or plus 500 milliseconds. These numbers and methods of calculation are only provided as examples; other numbers and methods of calculation may be used.

Using the same methods of calculation described in the prior two paragraphs, the system may automatically adjust the put performance threshold and the backlog threshold during ongoing operation of the system. This threshold automatic adjustment may be set to occur when initial values are set according to system default values or user provided values, and the threshold automatic adjustment may be set to be either on or off.

To store or put a data item, the system receives a storage request that includes a data item reference (or link to a data item) and a storage policy identifier, as shown in block 420. The storage request may be received from a client application running on a client device. The storage policy identifier for the data item may be a code or name. The storage policy may include or represent specific replication and distribution instructions for the referenced data item. The distribution instruction may specify the number of zones in which the data item should be stored, the number of nodes in which the data items should be stored, a specific redundancy scheme identifier, and the like. In another implementation, the specific distribution instructions may be hard coded or system defined or earlier set by a system administrator or similar user such that all data items are handled uniformly.

In some data storage system, the system would then attempt to store the data item, and would hang if storage in all nodes required by the policy could not be achieved. This could be because a zone is unreachable or otherwise disconnected so that it is unavailable. This could be because certain nodes in zones are full, down or otherwise unavailable. To alleviate this problem of blocking or hanging when waiting for a storage request to be completed, either in part or fully, before an attempt to store the data is made as requested, the latency to all storage zones implicated by the specified storage policy are evaluated to learn the latency to each storage zone, as shown in block 430. The backlog for each storage zone is also evaluated, as shown in block 440. That is, the number of pending object storage requests for storage zones is computed.

A check is then made to determine whether the backlog is acceptable, as shown in block 442. This check includes evaluation of whether the backlog is within or exceeds the user specified or system computed backlog threshold. If the backlog is not acceptable, as shown in block 442, the system then checks whether replication is set to be synchronous, as shown in block 450. If replication not synchronous, as shown in block 450, the system sets replication to be synchronous for the data item, as shown in block 452. In this way, the system attempts to force or require that the replication pursuant to the applicable policy be completed or proceed to reduce the backlog before any additional storage requests are processed as a way of reducing the current backlog of storage requests. A system degraded message or other similar message, as shown in block 494, may optionally be sent to one or more system administrators or key users or presented on a console or display before the flow of actions continues at block 430.

If replication is synchronous, as shown in block 450, the system sends an alert, as shown in block 490. In this way, when the system has attempted to synchronously handle data requests but an excessive backlog of storage requests exists, the key user, system administrator or the like is sent an alert (such as by email, text message, or the like) and/or a graphical user interface on a console associated with the system presents an alert. When the term "alert" is used herein, it refers to alerts like those described in the prior sentence. Here the alert would specify that the system is backlogged and cannot meet the storage policy requirements for the data item.

When the storage request backlog is acceptable, as shown in block 442, the system then checks whether latency to the zone is acceptable, as shown in block 460. That is, for the particular storage request and its associate storage policy, a check is made to learn whether the latency to nodes in that storage zone exceeds a user specified or system determined put performance threshold. If the latency to the storage zone is not acceptable, as shown in block 460, a check is made to learn whether replication is set to be asynchronous, as shown in block 480. If replication is set to be asynchronous, as shown in block 480, the system sends an alert, as shown in block 490. The alert may be sent to one or more the key users, a system administrator or the like in the form of an email note, text message, or other communication, and/or an alert may be posted via a graphical user interface on a console or display associated with the system. Here, the alert specifies that the current zone cannot be reached and it is likely that an excessive, unacceptable backlog will be created. This could cause the administrator or key user to select a new zone to replace the zone which cannot be reached within the put performance threshold and/or check on the performance of network, storage or other hardware.

When the latency to the storage zone is not acceptable, as shown in block 460, and replication is not set to be asynchronous, as shown in block 480, the system sets replication for the data item to be asynchronous, as shown in block 482. In this way, the system will handle the replication requests in due course while not blocking or waiting for the latency to the zone to immediately improve. Changing from synchronous to asynchronous removes system throughput delays while keeping the system resilient asynchronously. A system degraded message or other similar message, as shown in block 494, may optionally be sent to one or more system administrators or key users or presented on a console or display before the flow of actions continues at block 430.

When the storage request backlog is acceptable, as shown in block 442, and latency to the zone is acceptable, as shown in block 460, a check is made to learn whether the replication for the data item is set to be synchronous, as shown in block 470. When the replication is set to be synchronous, as shown in block 470, no additional action is taken and the flow of actions return to block 430. When the replication is not set to be synchronous, as shown in block 470, the system sets the replication to be synchronous as shown in block 472. In this way, because there is no delay to the storage zone specified in the policy for the data item and there is no backlog or an acceptable backlog, it is preferable to synchronously fully meet the policy of the storage requests as there is no system performance degradation that would result. Stated in the positive, because the system will perform within specified bounds (that is, the storage request backlog and latency thresholds are met), synchronous storage policies are implemented for improved resiliency. The flow of actions continues at block 430.

Figure 5:
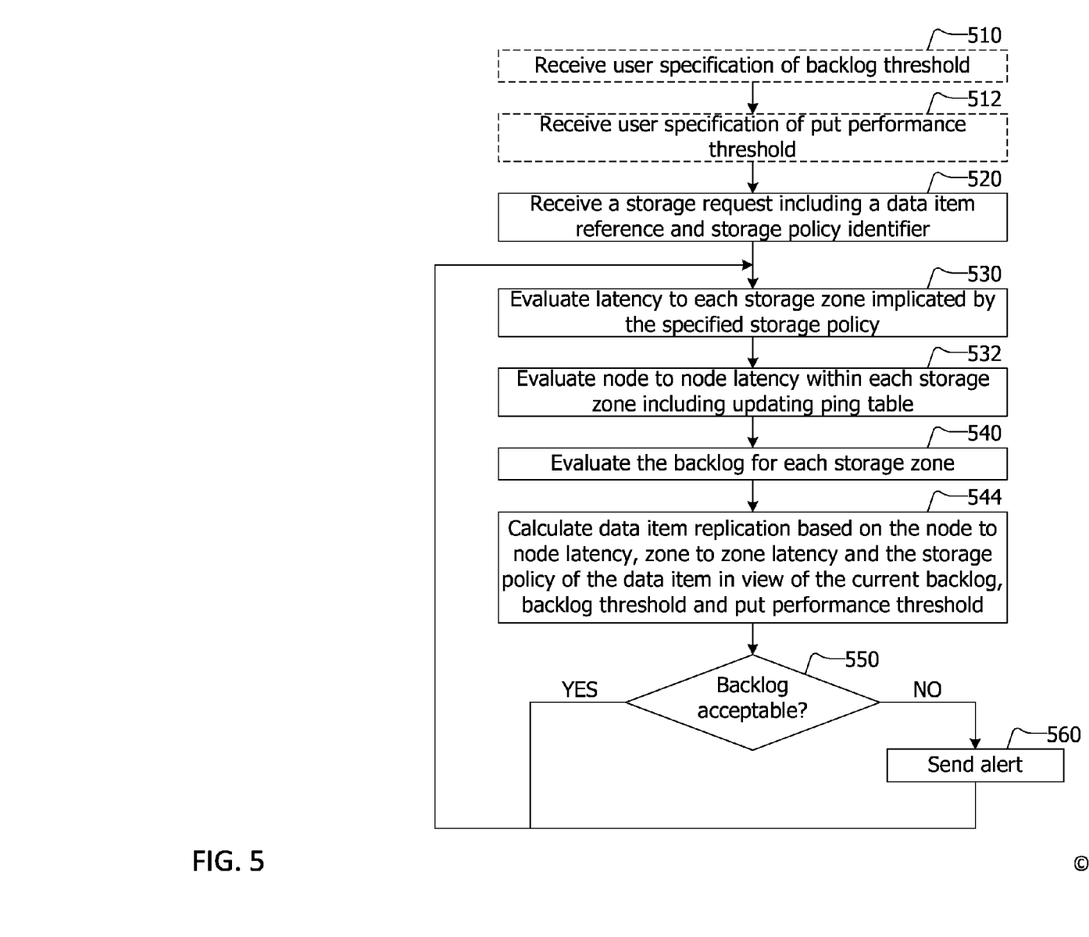
FIG. 5 is a flow chart of the actions taken to store or put data in a data storage system according to an automatic adaptive replication process.

Referring now to FIG. 5, a flow chart of the actions taken to store or put data in a data storage system according to an automatic adaptive replication process is shown. In one version of the system, the system receives user specification of a backlog threshold and a put performance threshold, as shown in blocks 510 and 512. The dashed lines for blocks 510 and 512 signify that these steps are optional. In other versions of the system, the backlog threshold and the put performance threshold may be system defaults or may be system learned. In some implementations of the system, initial setting of performance threshold and backlog threshold may be provided by a user or may be set to system default. In addition, the system may automatically adjust the performance threshold and backlog threshold during the ongoing operation of the storage system as set forth above. In this way, the storage system is an automatically adaptive storage system.

To store or put a data item, the system receives a storage request that includes a data item reference (or link to a data item) and a storage policy identifier, as shown in block 520. This is the same kind of storage request as described above regarding FIG. 4.

The method described alleviates the problem of blocking or hanging when waiting for a storage request to be completed, either in part or fully, before an attempt to store the data item is completed as requested, according to an automated switching between synchronous and asynchronous resilient storage request as needed to achieve the preferred throughput, performance and redundancy.

The latency to all storage zones implicated by the specified storage policy are evaluated to learn the latency to each storage zone, as shown in block 530. The node to node latency within each storage zone is evaluated, including updating a ping table, as shown in block 532. The ping table contains the time from one node to another node within a zone.

The backlog for each storage zone is also evaluated, as shown in block 540. That is, the number of pending data item storage requests for storage zones is computed.

The data item replication scheme is calculated based on the node to node latency, zone to zone latency and the storage policy of the data item in view of the current backlog, the backlog threshold and the put performance threshold, as shown in block 544. In an automatic transition version of the system, this calculation is based on information learned by the system. The system sets thresholds and the kind of replication based on averages and changes to the nodes within the zones and changes to latency of and/or access times to the nodes in a balancing of resiliency and throughput. As part of the replication scheme calculation, the kind of data replication (that is, the synchronicity) is determined by balancing between system throughput (or speed of operation) and data protection (or resiliency). To achieve this balance, the system switches between asynchronous replication and synchronous replication when needed. For, example if the replication policy for the data requires three copies, one in each of storage zones 110, 112 and 120, and if storing to zones 110 and 112 is within the latency threshold, and if storing to zone 120 exceeds the latency threshold, the replication scheme is changed so that the replication is synchronous to zones 110 and 112 but asynchronous to zone 120.

In one implementation, the information used by the system in calculating the current replication includes calculation of and consideration of a latency per transaction (l) which may be the sum of a drive or medium response time (d), a latency resulting from the network medium (n), and a processing latency (p), simply l=d+p+n. The processing latency (p) is driven by the extent to which a node is occupied or full and the efficiency (or speed) at which the node is accessible. The latency due to the network medium (n) may be the one way or round trip amount of time it takes for a request to travel between an initiator and the node.

When multiple replicas are specified in a policy, the latency per transaction (L) is proportional to the number of replicas (k). The transaction latency may be calculated as $$L = \sum_{i=1}^{k} l_i$$

When a node, a zone or the system handles objects asynchronously, each node accumulates a backlog per transaction (b). The transaction backlog may be calculated as b=n (k−θ), where θ is the total number of replicas synchronously replicated and n is the number of transactions. The size of the objects (s) (in bytes or kilobytes, for example) could be included in the calculation such that backlog B=ns (k−θ).

When there are multiple asynchronous policies (P) within a zone, the total replication backlog may be calculated by $$B = \sum_{i=1}^{N} \sum_{j=1}^{P} b_i^j$$

The system may identify when an object has been replicated fully in accordance with the applicable policy. In this circumstance, the backlog becomes zero. When an object is not replicated immediately during asynchronous replication, the time it takes for the object to be replicated to one of k replicas dictated by the policy is $$t_r = t_l + t_a + t_p$$

where,
$t_l$=time per transaction.
$t_a$=access time for the object or file
$t_p$=processing time (includes replication interval)

When the system has not yet completed replication, there are (k−θ) replicas that need to be achieved, the replication time is $$t_R = \sum_{i=1}^{k-\theta} t_{r_i}$$

The total backlog reduction time (T) may be calculated as $$T = \sum_{i=1}^{N} \sum_{j=1}^{P} b_i^j t_R$$

Returning to a discussion of FIG. 5, a check is then made to determine whether the backlog is acceptable, as shown in block 550. This check includes evaluation of whether the backlog is within or exceeds the user specified or system computed backlog threshold. If the backlog is not acceptable, as shown in block 550, the system sends an alert, as shown in block 560. In this way, when the system has attempted to handle data requests in an autonomous manner, but an excessive backlog of storage requests exists, the key user, system administrator or the like is sent an alert (such as by email, text message, etc.) and/or a graphical user interface on a console or display associated with the system presents an alert. Here the alert would specify that the system is backlogged and corrective actions needs to be taken, such as checking a particular storage node or storage zone, or checking a communication line or device.

If the backlog is acceptable, as shown in block 550, the flow of actions returns to block 530

The actions taken in FIGS. 4 and 5 may be applied to groups of objects in an object group. This increases the efficiency of object management. To achieve this, the actions shown in FIGS. 4 and 5 are taken upon groups of objects in an object group rather than single objects. In this way, when an object group could not be written according to a specified storage policy, all the storage synchronization of objects are handled as a group of objects in an object group. In this way, the system manages and stores all objects in the object group having a shared specified storage policy in a uniform way to reduce the amount of processing needed to handle the object.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. A system comprising:
    a plurality of storage zones, each storage zone comprising a plurality of nodes wherein each node comprises a plurality of storage devices and a controller, the controller including a processor and memory;
    a first node of a plurality of nodes included in a first zone of the plurality of zones, the first node having instructions which when executed cause a first processor included in a first controller in the first node to perform actions including:
        receiving a storage request that includes a data item reference and a storage policy identifier;
        evaluating a latency to each storage zone implicated by a storage policy associated with the storage policy identifier;
        evaluating a backlog for each storage zone implicated by the storage policy;
        changing the synchronicity based on consideration of whether storage is proceeding synchronously or asynchronously, the backlog for the storage zone and the latency for the storage zone.

2. The system of claim 1 wherein the changing the synchronicity includes:
    when the backlog is below a backlog threshold and the synchronicity is asynchronous, changing the synchronicity to synchronous;
    when the backlog is below a backlog threshold and the synchronicity is synchronous, sending an alert;
    when the backlog is below the backlog threshold and the latency exceeds a performance threshold, checking whether the synchronicity is asynchronous,
        when the synchronicity is not asynchronous, changing the synchronicity to synchronous,
        when the synchronicity is asynchronous, sending an alert;
    when the backlog is below the backlog threshold and the latency does not exceed a performance threshold, checking whether the synchronicity is synchronous,
        when the synchronicity is not synchronous, changing the synchronicity to synchronous,
        when the synchronicity is synchronous, continuing processing.

3. The system of claim 1 wherein the first node has further instructions which when executed cause the first processor to perform further actions including:
    receiving user specification of the backlog threshold;
    receiving user specification of the performance threshold.

4. The system of claim 1 wherein the backlog threshold and the performance threshold are system defined.

5. The system of claim 1 wherein the changing the synchronicity is done automatically, without user involvement.

6. The system of claim 1 wherein the first node has further instructions which when executed cause the first processor to perform further actions including:
    calculating the backlog threshold based on historical backlog information obtained over a first time period;
    calculating the performance threshold based on an historical latency information obtained over a second time period.

7. The system of claim 6
    wherein calculating the backlog threshold includes applying at least one of exponential smoothing, a taper function, and/or statistical analysis to the historical backlog information;
    wherein calculating the performance threshold includes applying at least one of exponential smoothing, a taper function, and/or statistical analysis to the historical latency information.

8. The system of claim 1 wherein the first node has further instructions which when executed cause the first processor to perform further actions including:
    automatically adjusting the backlog threshold based on historical backlog information obtained over a first time period;
    automatically adjusting the performance threshold based on historical latency information obtained over a second time period.

9. The system of claim 1 wherein the storage devices are one or more selected from the group including hard disk drives, magnetic tape and silicon storage devices.

10. The system of claim 1 wherein the storage devices are non-volatile random access memory (NV-RAM).

11. A system comprising:
    a plurality of storage zones, each storage zone comprising a plurality of nodes wherein each node comprises a plurality of storage devices and a controller, the controller including a processor and memory;
    a first node of a plurality of nodes included in a first zone of the plurality of zones, the first node having instructions which when executed cause a first processor included in a first controller in the first node to perform actions including:
        receiving a storage request that includes a data item reference and a storage policy identifier;

evaluating a latency to each storage zone implicated by a storage policy associated with the storage policy identifier;
evaluating node to node latency within each storage zone including updating a ping table;
evaluating a backlog for each storage zone;
calculating a replication synchronicity for the data item based on the node to node latency, the latency to each storage zone, and the storage policy in view of the backlog for the storage zone, the backlog threshold and the performance threshold.

12. The system of claim 10 wherein the replication synchronicity is either synchronous or asynchronous.

13. The system of claim 10 wherein the first node has further instructions which when executed cause the first processor to perform further actions including:
receiving user specification of the backlog threshold;
receiving user specification of the performance threshold.

14. The system of claim 11 wherein the backlog threshold and the performance threshold are system defined.

15. The system of claim 11 wherein the calculating the replication synchronicity is done automatically, without user involvement.

16. The system of claim 11 wherein the first node has further instructions which when executed cause the first processor to perform further actions including:
calculating the backlog threshold based on historical backlog information obtained over a first time period;
calculating the performance threshold based on an historical latency information obtained over a second time period.

17. The system of claim 16
wherein calculating the backlog threshold includes applying at least one of exponential smoothing, a taper function, and/or statistical analysis to the historical backlog information;
wherein calculating the performance threshold includes applying at least one of exponential smoothing, a taper function, and/or statistical analysis to the historical latency information.

18. The system of claim 11 wherein the first node has further instructions which when executed cause the first processor to perform further actions including:
automatically adjusting the backlog threshold based on historical backlog information obtained over a first time period;
automatically adjusting the performance threshold based on historical latency information obtained over a second time period.

19. The system of claim 11 wherein the storage devices are one or more selected from the group including hard disk drives, magnetic tape and silicon storage devices.

20. The system of claim 11 wherein the storage devices are non-volatile random access memory (NV-RAM).

* * * * *